P. R. BASSETT.
CONCENTRATED FLAMING ARC LAMP FOR PROJECTORS.
APPLICATION FILED JUNE 26, 1920.
1,428,510.  Patented Sept. 5, 1922.
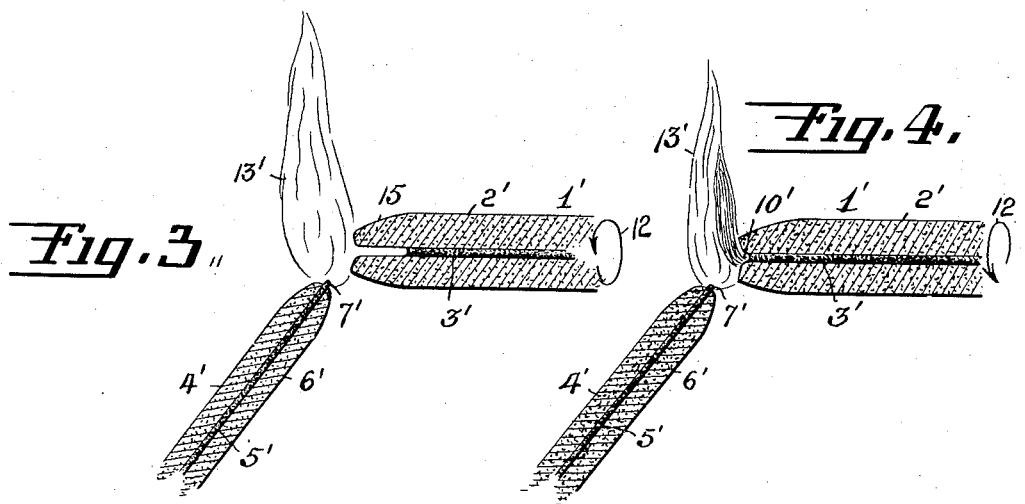
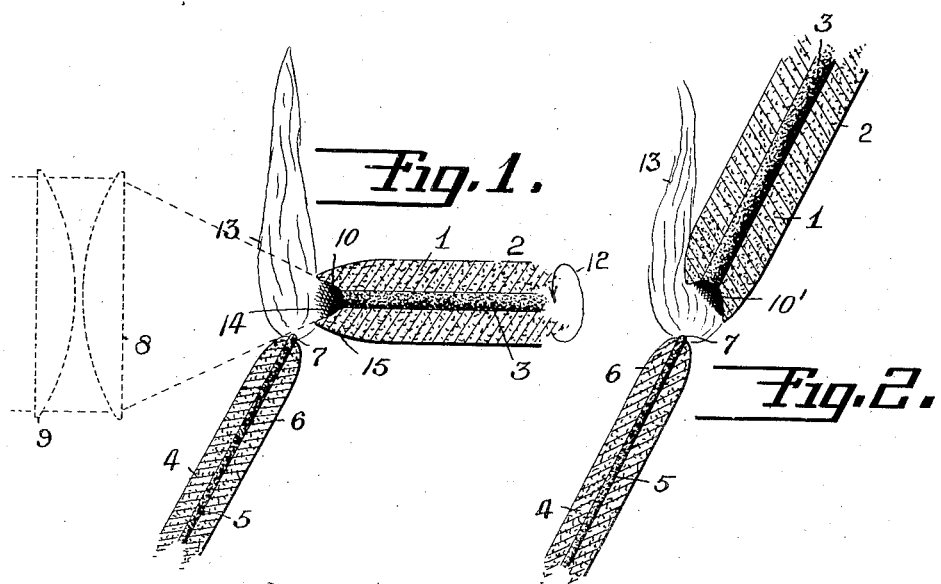
INVENTOR
PRESTON R. BASSETT
BY
Herbert H. Thompson
HIS ATTORNEY.

Patented Sept. 5, 1922.

UNITED STATES PATENT OFFICE.

1,428,510

PRESTON R. BASSETT, OF BROOKLYN, N. Y., ASSIGNOR TO THE SPERRY GYROSCOPE COMPANY, OF BROOKLYN, N. Y., A CORPORATION OF NEW YORK.

CONCENTRATED FLAMING ARC LAMP FOR PROJECTORS.

Application filed June 26, 1920. Serial No. 391,973.

*To all whom it may concern:*

Be it known that I, PRESTON R. BASSETT, a citizen of the United States of America, residing at 1716 Newkirk Avenue, Brooklyn, New York, in the county of Kings and State of New York, have invented certain new and useful Improvements in Concentrated Flaming Arc Lamps for Projectors, of which the following is a specification.

This invention relates to methods of securing by means of flaming arc electrodes a concentrated, brilliant light very similar to what is known as the high intensity arc, which consists in emanations located in the crater of a flaming arc operated at high current density and rapid electrode consumption, said arc being operated by direct current, in which instance the principal light source is in the positive crater.

Heretofore black body radiation running from 150 to 200 candlepower per square millimeter, usually nearer the former, has been considered for all artificial sources the brightest light obtainable, but starting with the twentieth century a new era was gradually ushered in by work upon this subject from a number of scientists, and especially by the introduction of the mineralized carbon, or by compound electrodes with a mineralized core and carbon shell, so that recently it has been possible to produce an electric arc of very much greater brilliancy emanating from the location of the positive crater. To accomplish this, however, it has been thought necessary, and so stated in the patent art, that very much higher current densities were required than had heretofore been used. Also very rapid consumption of the positive carbon was employed, resulting both from the high current density employed and the fact that the thin positive electrodes employed were provided with a relatively large highly impregnated core, while the shell of more refractory, pure carbon was not more than twice the core diameter. For instance, in the Sperry high intensity searchlight employing 150 amperes the positive electrode is only about $\frac{5}{8}''$ in diameter, as compared to $1\frac{1}{4}''$ diameter for a pure carbon arc of the same current, while the core of said Sperry electrode is about $\frac{5}{16}''$. In other words, the core has fully $33\frac{1}{3}\%$ of the area of the shell, while the high intensity electrode as a whole has only about one-third of the cross sectional area of the pure carbon electrode. Similarly with the high intensity light in my prior Patent 1,328,311, "Method of operating flaming arc lights for projectors," January 21, 1920, a small positive electrode is employed having a core fully half the diameter of the shell. The rate of consumption of each is approximately nine inches an hour. It will readily be seen that such a rate of consumption is so rapid as to lessen the commercial advantages of the light, such as for motion picture projection or general lighting where carbon expense might prove an important factor.

It is the object of the present invention to obtain a result comparable to the high intensity effect of the flaming arc lamp but at the same time reduce both the rate of electrode consumption and the power consumed to render the same practicable for commercial uses.

By my invention I am able to produce a concentrated flaming arc in which the rate of consumption is no greater than that of the present design of pure carbon arc lamps employing approximately the same current and at the same time to greatly increase both the total candlepower and concentration of the source without increasing, and in fact decreasing, the watts consumed. My invention has special reference to the production of a concentrated, intense light source for the projection of motion pictures in which rapid burning electrodes are so serious a drawback as to render the high intensity light as now made impracticable.

By my invention I not only increase the total light emanated but greatly increase the light thrown on the screen beyond the increase in total light by concentrating the light source substantially entirely within the crater of the positive electrode, in other words by reducing the light source more nearly to an ideal point at the focus of the projector. At the same time I greatly decrease the rate of electrode consumption over present forms of high intensity lights and the total watts consumed. In brief, to accomplish my invention I at once increase the overall size of the positive electrode and decrease the size of the highly impregnated core as employed in the high intensity light, within certain well defined limits, however.

Referring to the drawings in which is now considered to be the preferred form of my invention is shown:

Fig. 1 shows a preferred burning condition in which the positive electrode has a core of substantially the correct size and the carbons are positioned at the preferred angle.

Fig. 2 shows an alternative burning condition which, while not now considered as satisfactory as the burning condition shown in Fig. 1, will produce superior results to the present type of arc employed in motion picture projection.

Fig. 3 shows a poor burning condition arising from the employment of a positive electrode with too small a core.

Fig. 4 shows the same arc as the flames appear during a portion of the burning of the arc; the appearance of the flames alternating between the position shown in Fig. 3 and the position shown in Fig. 4.

Fig. 5 is a view showing the manner in which the present type of positive electrode used for high intensity flaming arcs and designed to employ approximately double the current of that shown in Fig. 1 would burn if an attempt were made to operate it under the conditions of Fig. 1.

As before stated, the rate of consumption of electrodes in the high intensity lamp is very rapid and while the light produced is equal to, or it may be superior in total candlepower to the light produced by my invention and the concentration of the source excellent, the rate of electrode consumption is such as to be commercially impracticable. Not only does the rapid rate of consumption increase the cost by requiring close attention on the part of the operator and frequent extinguishing for replacing the electrodes but the character of the long, slender, large cored electrodes used in high intensity lamps renders them individually expensive. These conditions, coupled with the rapid consumption, increase tremendously the cost of supplying the lamps.

According to my invention I employ a comparatively large positive electrode, i. e., an electrode much larger than heretofore employed in high intensity arc lamps of the same amperage. In fact, the electrode I employ is very nearly the same size as a pure carbon electrode of the same amperage and does not vary materially from present standard practice. For a current of 70 amperes, which has been found to give good results under the working conditions of this invention, an electrode of about $\frac{5}{8}''$ is preferably employed, as compared to $\frac{7}{16}''$ for 75 ampere high intensity lamps as illustrated in my said prior patent. The increase in cross section area is, therefore, more than a hundred per cent. The diameter, it will be seen, is substantially the same as the diameter of pure carbon electrodes now used according to the best practice in projector work for this current. As low a current as from 45 to 50 amperes has also been found to give good results. For this current a positive electrode $\frac{7}{16}''$ diameter has been found to give good results.

Said electrode 1 has a shell 2 of pure carbon and a core 3 highly impregnated with flaming arc materials (rare earths such as cerium, etc.). Also in sharp contrast to the standard high intensity flaming arc electrodes the core is very small as compared to the shell, the diameter ratio being 1:4 or 5 and the area of the core being only about $\frac{1}{15}$th to $\frac{1}{24}$th the area of the shell as compared to a standard core-shell area ratio for high intensity arcs of 1:4. The electrode, therefore, is not operated at as high a current density as the high intensity arc which usually exceeds 400 amperes per square inch of area of the positive electrode, but is operated at moderate current density, i. e., from 200 to 300 amperes per square inch of area of the positive electrode, it being very probable, however, that the very small, highly impregnated core carries a heavy current. The mineralization of the core is preferably high. Fifty per cent mineralization has been found to give good results. The reason for the very low carbon consumption will be at once apparent, since by both the increase in the overall size of the electrode and the decrease in the size of the rapidly consumed core, the area of the slow burning shell is increased almost three fold and the area of the core decreased to less than one-half.

The negative electrode 4 is preferably provided with a core 5 having a different density from the shell 6, being preferably much harder than the shell. Both core and shell however, may be of pure carbon, or at least not impregnated with flaming arc materials. The negative electrode is preferably smaller than the positive being about one-half the diameter of the positive. When a hard core is used it tends to protrude slightly beyond the normal rounded surface of the negative electrode as shown at 7. The size and characteristics of the electrodes are given by way of example, only for a current of from 65 to 75 amperes. It will be understood, of course, that with an increase or decrease in current (within limits) the size of each electrode should vary in proportion.

The preferred position for the electrodes is with the positive facing the projecting lenses indicated at 8 and 9 and, therefore, substantially horizontal, with the negative at a steep angle thereto (say 55°), as shown in Fig. 1. When in such position the negative flame 13 rises substantially vertically past the positive crater 14 touching the same only at the crater face without enveloping it. The arc length employed is also unusually short, i. e., about $\frac{1}{4}''$ or less. The short arc length, coupled with the low resistance of the flaming arc, results in a very low voltage drop across the arc, i. e. about 40 to 45 volts as compared to a pure carbon horizontal arc of the same amperage of 50 to 55 volts. Very marked spindling of the positive electrode takes place at 15 owing to the fact that it is slowly consumed. Since, however, the shell is very thick it does not spindle down to the core, as described in my previous Patent 1,328,311, but forms a fairly deep crater 14 somewhat as indicated in Fig. 1. In said crater is confined the globule 10 of glowing white hot vapors forming the concentrated, principle light source of the arc which compares favorably with the high intensity arc. The strength of the current employed, however, is not sufficient to cause the ball of light to project, at least markedly, beyond the crater but remains within the crater. With the carbons in this position the positive electrode is preferably rotated to maintain the crater symmetrical with uniform burning conditions, rotation being indicated by the arrow 12.

According to my invention a concentrated light source may also be produced with the carbons in the position shown in Fig. 2 in which both electrodes are inclined slightly to the vertical, the positive crater facing slightly toward the projecting lenses (not shown). In this form of the invention the positive is preferably not rotated, the negative flame being carried by the upwardly rising air currents past the positive electrode on the top side only. While this results in uneven burning, at the same time a substantial, oblique crater 10' is formed which has the advantage of being faced in the general direction of the lenses. The crater is, as a rule, deep enough to maintain the high intensity vapors within the same. Such lamps are usually designed so that each carbon may be adjusted laterally, principally so that the negative can be advanced beyond the alinement with the positive to maintain the obliquity of the crater. It is found that the operator, by advancing and retracting the negative electrode, can maintain a fair oblique crater.

The reduction of the size of the core can, of course, be carried to too great an extent, however. This extreme is illustrated in Figs. 3 and 4 and results in two different burning conditions which alternate, the arc passing from one to the other as the rapidly burning core 3' first burns back to such a great depth (Fig. 3) that the flame 13' leaves the core 3' and jumps to the shell 2'. When this occurs the arc reverts to the ordinary arc and loses not only over half its total candlepower but also its light concentration. When the shell has burned back to the core the flaming materials from the core again enter the flame at 10', as shown in Fig. 4, producing a fairly good arc until the condition shown in Fig. 3 again arises. Such an arc is, of course, unsatisfactory for motion picture projection. In order to avoid the burning conditions arising as shown in Figs. 3 and 4 the diameter of the core should not be reduced below about one-sixth of the diameter of the shell.

On the other hand, if too large a core is employed, the concentrated, intense light source will disappear altogether. Fig. 5 shows a high intensity electrode drawn to the same scale as Fig. 1 and designed for operation at over double the current, i. e. 150° amperes. The diameter of the electrode 20 is the same as my electrode using 70 amperes, while the core 21' is $\frac{5}{16}''$ as compared to $\frac{1}{8}''$ in my electrode. The figure illustrates such an electrode operated at 70 amperes, i. e., the same current and current density as employed in Fig. 1. No high intensity effect or concentrated light source is obtained, however, the arc appearing as an ordinary white flaming arc.

Having described my invention, what I claim and desire to secure by Letters Patent is:

1. The method of producing a concentrated flaming arc without the employment of high current density and rapid electrode consumption, which consists in employing a positive carbon having a small, highly mineralized core of as high diameter ratio to the shell as 1:4 and a negative electrode of less diameter than the positive and operating such arc at ordinary current density.

2. The method of producing a concentrated flaming arc of moderate current and electrode consumption, which consists in employing a positive carbon having a small core impregnated with flaming materials and a pure carbon shell of at least four times the diameter of said core, said carbon being of not materially different diameter from the standard non-flaming electrodes for the same current in conjunction with a non-flaming negative electrode of less diameter, and operating such arc at less voltage drop than such standard non-flaming arc at the same current.

3. The method of producing a concentrated flaming arc of moderate current and electrode consumption, which consists in employing a positive carbon having a small core highly impregnated with flaming materials and a pure carbon shell of at least four times the diameter of said core, said carbon being of not materially different diameter from the standard non-flaming electrodes for the same current in conjunction with a non-flaming negative electrode having a hard core, and operating such arc at less voltage drop than such standard non-flaming arc at the same current.

4. The method of producing a concentrated flaming arc without the employment of high current density and rapid electrode consumption, which consists in employing a positive carbon having a small, highly mineralized core of as high diameter ratio to the shell as 1:4 and a negative electrode of less diameter than the positive having a carbon core differing in density from its shell and operating such arc at ordinary current density and at short arc length.

5. The method of producing a concentrated flaming arc without the employment of high current density and rapid electrode consumption, which consists in employing a positive carbon substantially twice the diameter of the positive carbon of the standard high intensity arc for the same current and having a small, highly mineralized core of as high diameter ratio to the shell as 1:4 and a negative electrode of less diameter than the positive and operating such arc at ordinary current density and low voltage drop.

6. The method of producing a concentrated flaming arc without the employment of high current density and rapid electrode consumption, which consists in employing a positive carbon having a small, highly mineralized core of as high diameter ratio to the shell as 1:4 and a negative electrode and relatively positioning said electrodes during the burning of the arc for an arc length of not substantially more than one-quarter of an inch and at such an angle that the negative flame sweeps vertically past the positive crater without enveloping the tip.

7. The method of producing a concentrated flaming arc of moderate current and electrode consumption, which consists in employing a positive carbon having a small core impregnated with flaming materials and a pure carbon shell of at least four times and not more than six times the diameter of said core, said carbon being of not materially different diameter from the standard non-flaming electrodes for the same current in conjunction with a non flaming negative electrode of less diameter, and operating such arc at less voltage drop than such standard non-flaming arc at the same current.

8. The method of producing a concentrated flaming arc without the employment of high current density and rapid electrode consumption, which consists in employing a positive carbon substantially twice the diameter of the positive carbon of the standard high intensity arc for the same current and having a small, highly mineralized core of as high diameter ratio to the shell as 1:4 and positioning the negative electrode at a steep angle and not more than $\frac{1}{4}''$ from the positive electrode.

9. The method of producing a concentrated flaming arc without the employment of high current density and rapid electrode consumption, which consists in employing a positive carbon of about $\frac{5}{8}''$ diameter having a small highly mineralized core and having as high diameter ratio to the shell as 1:4, positioning the negative electrode at a steep angle and not more than $\frac{1}{4}''$ from the positive electrode and impressing current in the vicinity of 75 amperes on said electrode.

In testimony whereof I have affixed my signature.

PRESTON R. BASSETT.